INVENTOR
G.W. SODERMAN
ATTORNEY

United States Patent Office 3,020,680
Patented Feb. 13, 1962

3,020,680
CONTOUR GRINDER
George W. Soderman, Alpine, N.J., assignor to Western Electric Company, Incorporated, New York, N.Y., a corporation of New York
Filed June 26, 1958, Ser. No. 744,701
1 Claim. (Cl. 51—73)

This invention relates to apparatus for grinding articles, particularly piezo-electric crystals, to give them sphero-flat contours.

So called sphero-flat crystals are circular in shape having on each side a central, concentric "flat" and an annular portion of a specified spherical radius extending from the periphery of the "flat" to the outer edge of the crystal. The manufacturing tolerances on the spherical radius and on the diameter and concentricity of the "flat" are usually very small so that apparatus for making such crystals must be highly adjustable and capable of doing very accurate work.

The object of the present invention is the production of such an apparatus.

In accordance with the object, the invention comprises an apparatus operable in combination with a continuously driven cup grinder having a grinding surface cross-sectionally curved about a given center. The apparatus includes a carriage mounted for movement about an axis spaced from and disposed short of the curved grinding surface. The carriage supports a crystal driving unit operable to drive a hollow chuck supporting spindle, a chuck of which is adapted to removably hold a crystal in position to be ground.

The driving unit is pivotally mounted on the carriage for movement between a loading position and a grinding position and the carriage supports an arm movable with respect to an adjustable stop controlling the grinding movement of the carriage for moving the article relative to the grinding surfaces. A time controlling feeding means associated with the arm controls movement of the arm and the carriage to move the article relative to the grinder.

More specifically, the crystal driving unit includes a motor, energized when moved out of the loading position, to drive the spindle and the article. The spindle, as well as the chuck carried thereby, are longitudinally hollow, for connection with a suction pump through a line opened by a valve to the pump when the article is placed in the chuck. A support for the crystal drive unit is movable on the carriage about an axis parallel with the axis of the carriage and in alignment with the cross-sectional center of the curved grinding surface to permit variation of the angular position of the driving unit relative to the grinder.

Other objects and advantages will be apparent from the following detailed description when considered in conjunction with the accompanying drawings, wherein.

Figure 3:
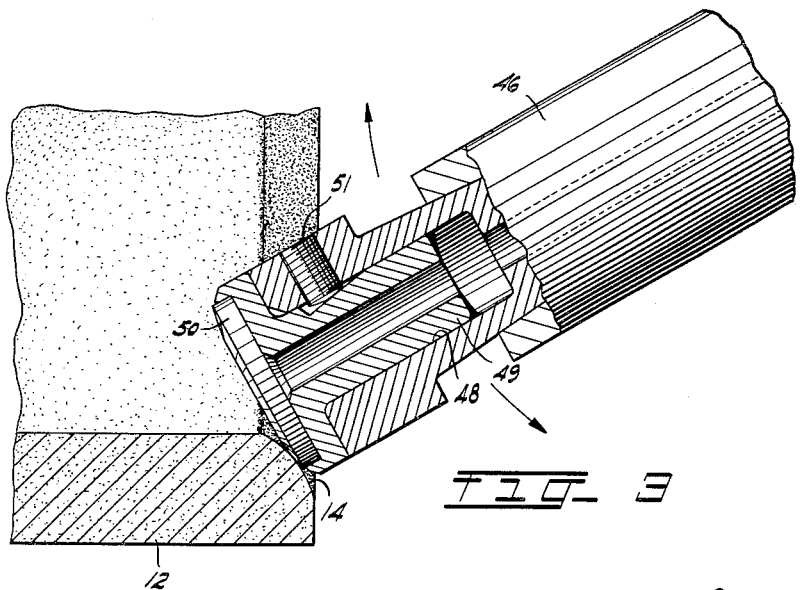
FIG. 3 is an enlarged fragmentary sectional view of the grinding area of the apparatus illustrating the grinding of the first face of the crystal portions.
Figure 4:
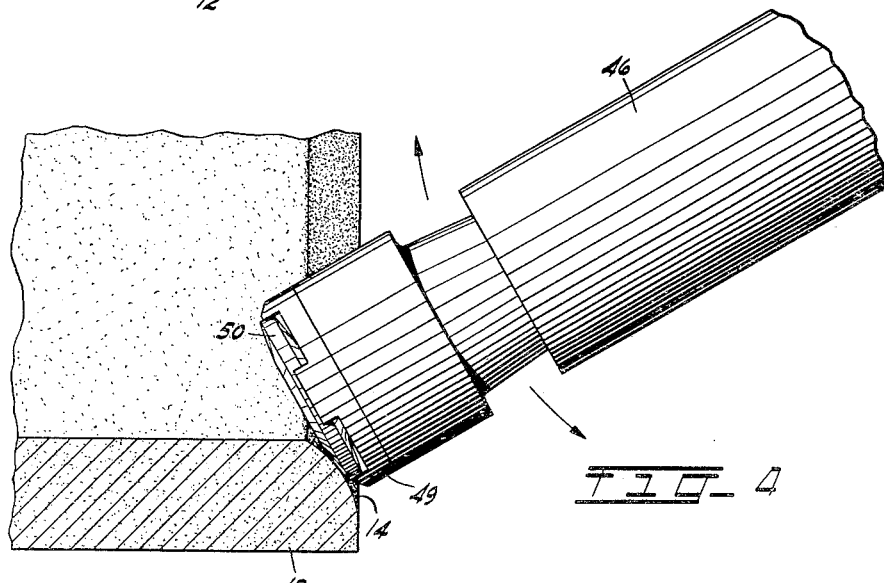
FIG. 4 is an elevational view of the structure shown in FIG. 3 illustrating the grinding of the second face of the crystal.
Figure 5:
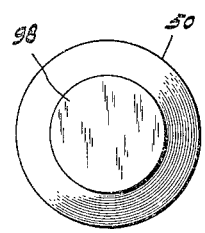
FIG. 5 is a front elevational view of a ground crystal.

The apparatus is mounted on a base 10 which supports a conventional grinding unit 11 driven continuously during operation of the apparatus to rotate a diamond cup grinder 12, having a grinding surface 14 cross-sectionally curved about a given center as shown more clearly in FIGS. 3 and 4. The grinder 12 is surrounded by a housing 15, with the exception of an opening 16 and an aperture to receive a line 17 from a supply of a suitable liquid for the grinder under the control of a valve 18.

The apparatus includes a carriage 20, mounted on a spindle 21 which is supported by bearings 22 in a housing 23 fixed to the base 10. A crystal driving unit, indicated generally at 24, is mounted on a support 25, which is movable about a pivot 26 on the carriage 20. The support 25 carries a screw 27 which extends downwardly through an elongate arcuate aperture 28 in the carriage 20. The screw 27 is provided with a nut 29 having a handle 30 for loosening the nut on the screw to permit adjustment of the support 25 about the pivot 26 into any desired angular position on the carriage. An angle gage 31, fixed to the adjacent arcuate face 32 of the carriage permits location of the support 25, through the aid of an indented marking line 33 in the adjacent face of the support 25, to assist in locating the crystal driving unit 24 in its desired angular position wtih respect to the grinder 12.

The unit 24 has a housing 35 mounted on a base portion 36. A spindle-like member 37 centrally disposed in the base portion 36 extends through a bearing 38 carried by the support 25 to condition the housing and base portion for rocking movement about the axis of the spindle from a loading position to a grinding position. The spindle 37 has a reduced threaded portion 39 extending through an aperture in the support 25 where it is secured by nuts 40. A spring pressed plunger 41, having its housing 42 threadedly and adjustably mounted in an aperture of the support 25, is positioned to enter a recess 43 of the base portion 36 to locate the unit 24 in the grinding position.

Figure 1:
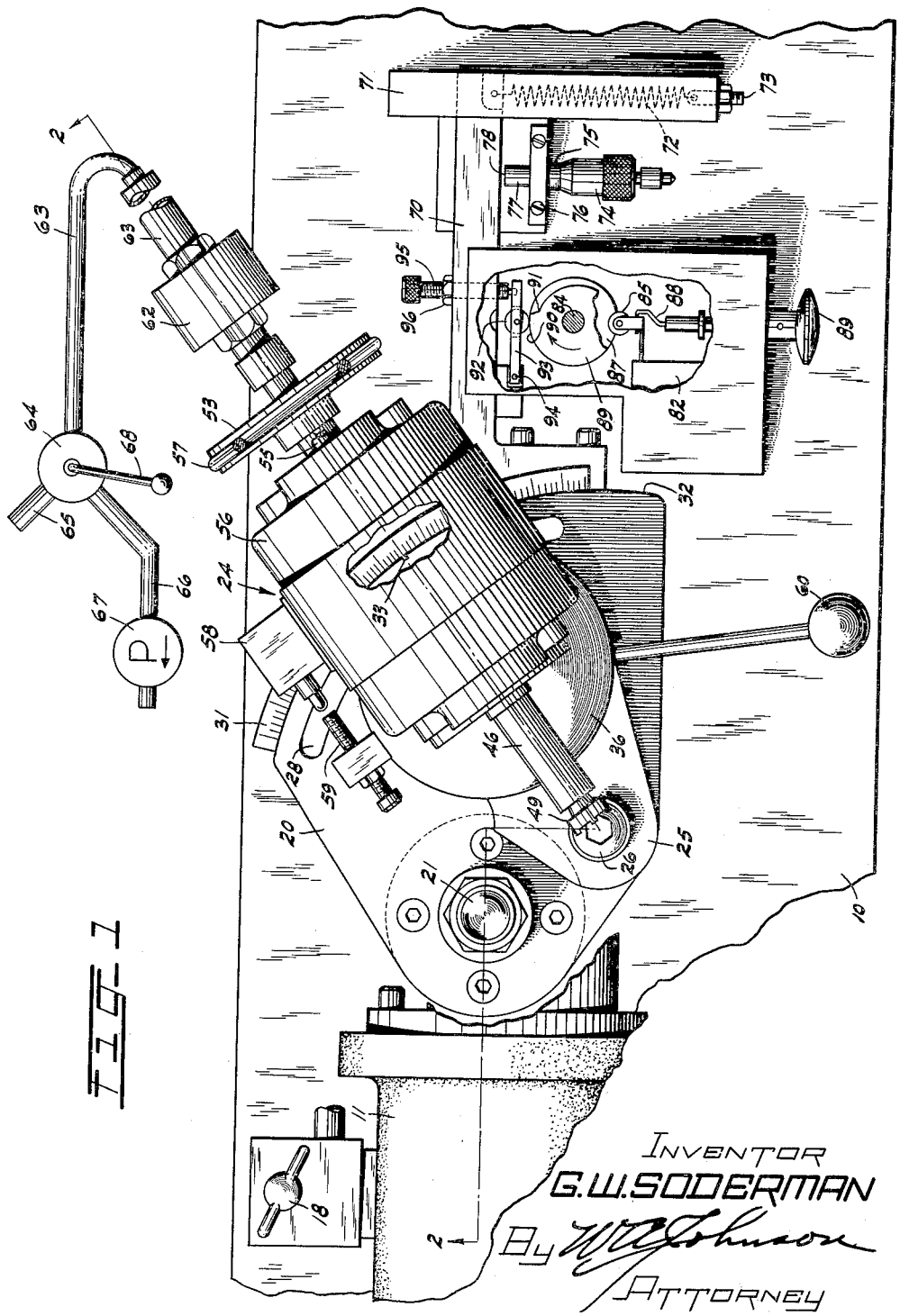
FIG. 1 is a top plan view of the apparatus shown in combination with the grinder.
Figure 2:
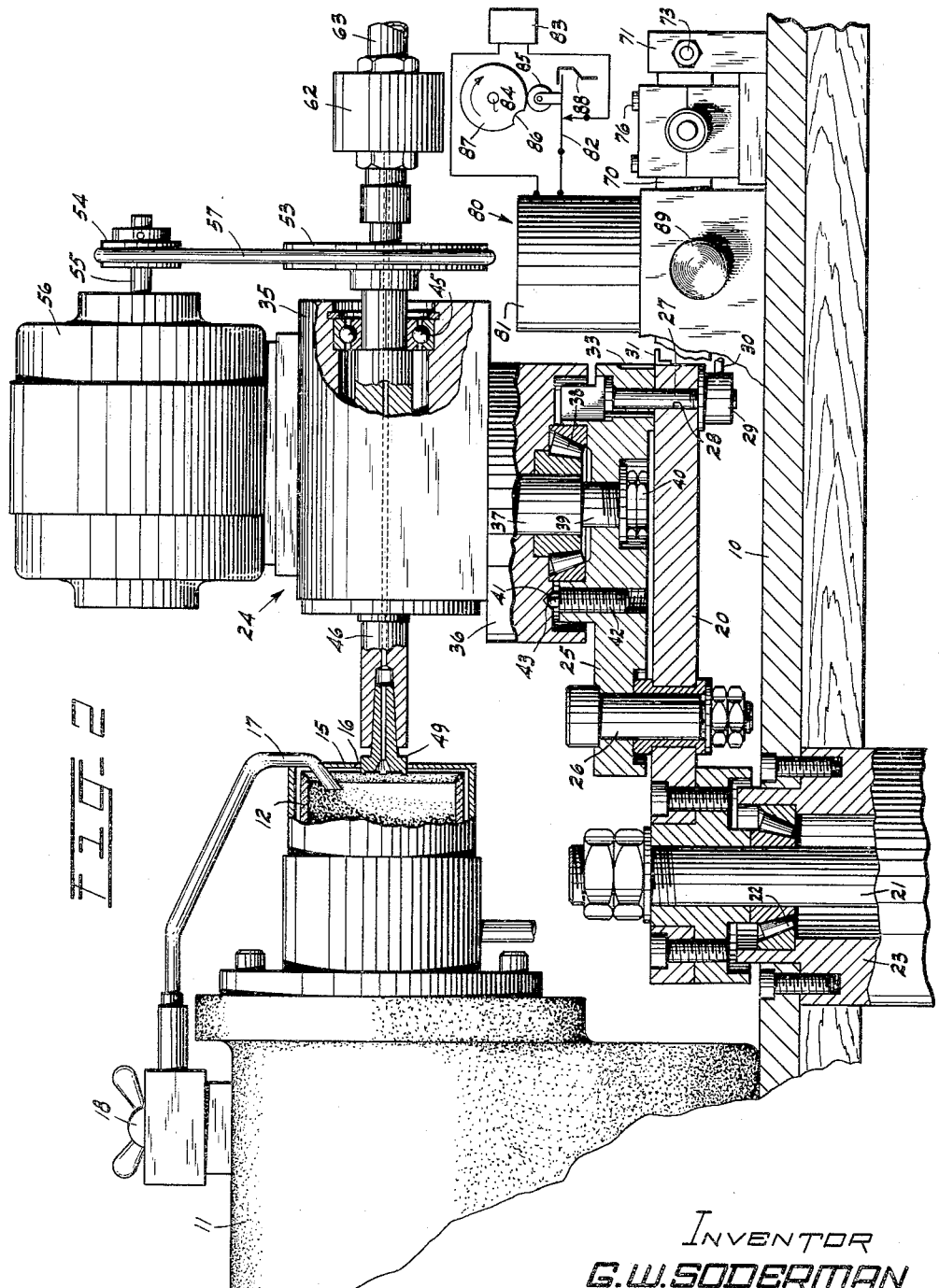
FIG. 2 is a vertical sectional view taken substantially along the line 2—2 of FIG. 1.

The housing 35 has spaced bearings 45, only one of which is shown, to support a hollow spindle 46, formed at its left end with an enlarged portion of its longitudinal aperture 48 to receive any one of a plurality of chucks 49 for crystals 50 of different sizes to be ground. The chucks are removably held in place singly by a set screw 51. The right end of the spindle has a pulley 53 mounted thereon and connected to a pulley 54 of a shaft 55 of a motor 56 by a belt 57. The motor 56 is mounted upon the housing and is under the control of a normally closed switch 58 moved into open position by engagement with an adjustabe stop 59, when the unit 24 is moved into the loading position shown in FIG. 1 by the aid of a handle 60 fixed to the base portion 36 of the housing 35. A coupling 62, connects the rotatable spindle 46 to a stationary suction line 63 which, as illustrated schematically in FIG. 1, extends to a hand control valve 64. The valve 64 has one line 65 open to the atmosphere and another extending to a suction means such as a pump 67. When the handle 68 of the valve 64 is in the position shown in FIG. 1, lines 63 and 65 are connected to permit air to travel through the hollow spindle and the chuck to free a crystal from the chuck 49. This is necessary for initially loading a crystal in the chuck or for removing a crystal having its first face ground so that the crystal may be reversed in position for grinding the second face. By turning a handle 68 to another position, line 63 may be closed to line 65 and open to line 66 so that the pump 67 will create sufficient suction to hold the crystal in the chuck prior to and during each grinding operation.

The carriage 20 has an arm 70 fixed thereto and extending to a position where its forward or right end extends into a guide 71 mounted on the base 10. A spring 72, the tension or pulling force of which may be varied through the adjustment of a screw 73, urges the arm clockwise about the axis of the pivot 21. A micrometer 74 having its central portion 75 mounted in a bracket 76, leaving its outer portion free for rotation, and its inner portion 77 free for longitudinal movement to vary the location of its end 78 with respect to the adjacent surface of the arm 70, is a stop to control the arcuate grinding motion imparted to the crystal. The grinding interval or the time allowed for the grinding of each face of each crystal is under the control of a timing unit 80. This unit begins with a fractional horse power motor 81 which is under the control of a switch 82 in a circuit from a source 83 of electrical energy. The switch 82 is normally urged into open position where, at the end of each cycle of the motor shaft 84, a roller 85 of the switch enters a recess 86 of a cam 87 to open the circuit to the motor. The switch may be actuated into closed position manually by a hook-shaped member 88 fixed to a handle 89 which may be moved outwardly to initially close the switch and hold it closed temporarily until the recess 86 has moved beyond the roller 85 so that the cam 87 will hold the switch closed for one revolution. In the present instance, the motor travels at one revolution per minute, which is the time allowed for grinding each face of each crystal. The shaft 84 may be the direct motor shaft or the output shaft of a reduction gear unit associated with the motor 81 to accomplish the one revolution per minute or per chosen time interval required for the grinding operation. A cam 89 mounted on the shaft 84 has a high portion 90 gradually diminishing to a low portion 91 to allow movement of the arm 70 with the carriage 20 and the crystal driving unit 24 through the feeding arc for grinding the spherical contours on the faces of the crystals. To make the connection between the cam 89 and the arm 70 highly variable for the various sizes of crystals, a follower 92 for the cam is rotatably carried by a lever 93 pivotally supported at one end at 94 on a projection of the arm 70 while an adjustable screw 95, extending through a threaded aperture in the arm 70 and held in selected position by a lock nut 96, has its inner reduced end interengaging the end of the lever opposite its pivot 94 to control the position of the contact between the cam 89 and the arm 70.

*Operation*

To condition the apparatus for operation, a substitute chuck may be inserted in the spindle 46 including a suitable metallic element acting as a template or substitute for the crystal. These are used for adjustment of the carriage 20 while the driving means for the grinder is de-energized to move the element into engagement with the grinding surface. At this time, the micrometer 74 is adjusted in its support 76 to position the end 78 with a zero reading on the micrometer to indicate the starting of the setting of the apparatus. The support 25 is adjusted about its pivot 26 until the marking line 33 registers with the desired angle marking on the angle gage 31. The support 25 is locked in this position through actuation of the nut 29 by its handle 30. During initial grinding operations on the first crystal the cam 89 and the follower 92 are used to control movement of the crystal relative to the grinder. Prior to each test grinding the micrometer 74 is adjusted to a predetermined position, moving the end 78 back from its initial or zero setting. Prior to and during the grinding operation on the initial crystal the crystal is held in the chuck 49 by a suction created by the pump 67 during location of the valve 64 to connect lines 63 and 66 of FIG. 1. When the initial grinding operation has been performed, the unit 24 is moved from the grinding position to the loading position at which time the valve 64 is actuated to free the crystal being ground so that it may be removed and tested to determine whether or not the setting is sufficient to produce a flat 98 on the crystal 50 of the desired diameter. At this time, the curvature of the ground portion may be gaged to determine whether or not the radii of this portion are as required. The closeness of these dimensions determine the amount of additional adjustments in the micrometer 74 and/or the angular adjustments of the unit 24 and its support 25 on the carriage 20. When the initial crystal is ground to the desired dimensions on one side thereof, the micrometer 74 remains set at its final adjusted position to establish the stop for the grinding on this and other like crystals. At this time the motor 81 of the unit 80 has been de-energized to locate the low portion 91 of the cam 89 directly beneath the follower 92. While in this position, the screw 95, freed for adjustment by the nut 96, is moved to cause its reduced inner end to engage the lever 96 to establish the setting for the follower so that when engaging the lower portion 91 of the cam, which designates the end of the grinding cycle, the arm 70 of the carriage 20 will engage the stop surface 78 of the micrometer. The first crystal, which has one surface ground, is removed from the chuck, and reversed in position for grinding the other surface. The motor 81 is energized momentarily to return the output shaft 84 to the starting position with the high porion 90 of the cam 89 beneath the follower 92 and the arm 70 with the associated structures moved about the axis of the spindle 21 for the beginning of the next grinding cycle. When the output shaft 84 is in the position just described, the cam 87 is located with its recess 86 receiving the switch roller 85 to permit the switch 82 to open. At this time the unit 24, through the aid of the handle 60, is swung about its spindle 37 from its loading position to its grinding position to move the crystal into position to start grinding of the second surface. The moment the unit 24 leaves the loading position, the switch 58 is allowed to close, energizing a motor 56 to drive the spindle 46 and the chuck 49. The grinding cycle actually begins with the manual movement of the handle 89 to close switch 82 moving the roller 85 out of its recess 86 and holding the switch closed after the start of the energization of the motor 81 until the high portion of the cam 87 is moved to engage the roller 85 and cause it to hold the switch closed for the completed cycle of the output shaft 84. This cycle takes place during the predetermined time desired for the grinding operation. In the present instance, this time is one minute and it will be approximately one minute from the time the grinding operation begins until the arm 70 engages the stop 78 and the cam follower 92 reaches the lowest portion 91 of the cam 89. The last action of the cam 89 is to raise the cam follower 92 to move the arm 70 away from the stop and thereby remove the crystal from the grinding surface. As soon as this has been accomplished the roller or follower 85 enters the recess 86 of its cam 87 and the switch 82 is permitted to open, de-energizing the motor 81. This completes the first operating cycle. This operation may be repeated for crystals of like sizes. After numerous operating cycles, the grinder may require sharpening which would include the removal of a minute thickness of the grinder. This variation in the setting of the apparatus may be compensated for thorough adjustment of the micrometer 74 and the cam follower 92.

If it is desired for the apparatus to grind crystals of the same size with flats 98 of different diameters and spherical portion of different radii, these conditions may be accomplished by changing the angular position of the unit 24 and its support 25 on the carriage 20 and also varying the cutting depth by adjusting the micrometer 74. Similar adjustments can be made for crystals of different sizes or of different thicknesses requiring in some instances chucks which are similar in structure but different in sizes.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

An apparatus for grinding sphero-flat crystals with faces of predetermined diameters comprising a continuously driven cup grinder having an inner grinding surface cross-sectionally curved about a given center, a carriage mounted for movement about an axis spaced from and disposed short of the grinding surface, a crystal driving unit, a hollow chuck supporting spindle driven thereby, a hollow chuck adapted to removably hold a crystal in position to be ground removably disposed in one end of the hollow spindle, a support for the crystal driving unit mounted on the carriage, a pivot for the crystal driving unit interposed between the crystal driving unit and the support to condition the crystal driving unit for movement to move its chuck between a loading position for the chuck away from the grinding surface and a grinding position for the chuck adjacent the grinding surface, an arm fixed to the carriage and projecting away from the carriage and the axis thereof, means to force the arm through a feeding motion to move the carriage a given distance about its axis to cause feeding of the crystal to the grinding surface of the grinder, a micrometer with an arm engageable end, means to mount the micrometer at a fixed position with its arm engageable end positioned to be engaged by the arm when the crystal is positioned to engage the grinding surface and the micrometer is set to locate the end at a zero position so that the micrometer, when adjusted to locate the end at a known position from the zero position, will terminate the grinding cycle a predetermined variable distance from the start of the grinding cycle, and a unit operatively connected to the arm and operable to control movement of the carriage to complete the grinding cycle for the crystal in a predetermined length of time.

References Cited in the file of this patent

UNITED STATES PATENTS

| | | |
|---|---|---|
| 1,102,558 | Van Norman | July 7, 1914 |
| 2,087,514 | Hubbell | July 20, 1937 |
| 2,149,409 | Van Norman et al. | Mar. 7, 1939 |
| 2,291,000 | Simpson | July 28, 1942 |
| 2,405,417 | Fruth | Aug. 6, 1946 |
| 2,548,418 | Bernheim et al. | Apr. 10, 1951 |
| 2,589,488 | Fowler | Mar. 18, 1952 |